(12) United States Patent
Lebrun et al.

(10) Patent No.: US 7,555,371 B2
(45) Date of Patent: Jun. 30, 2009

(54) AUTOMATIC PILOTING DEVICE FOR ROTARY WING AIRCRAFT

(75) Inventors: Jean-Louis Lebrun, Antony (FR); Jean Foisneau, Toulouse (FR)

(73) Assignee: Thales (FR)

( * ) Notice: Subject to any disclaimer, the term of this patent is extended or adjusted under 35 U.S.C. 154(b) by 471 days.

(21) Appl. No.: 11/353,243

(22) Filed: Feb. 14, 2006

(65) Prior Publication Data

US 2007/0010920 A1   Jan. 11, 2007

(30) Foreign Application Priority Data

Feb. 15, 2005   (FR)   ................... 05 01524

(51) Int. Cl.
*G01C 23/00* (2006.01)
(52) U.S. Cl. ............................. 701/11; 701/3
(58) Field of Classification Search ................ 701/3, 701/11, 14; 244/75.1, 76 R
See application file for complete search history.

(56) References Cited

U.S. PATENT DOCUMENTS 4,500,967 A * 2/1985 Murphy et al. ............... 701/12

5,301,112 A   4/1994   Gold et al.

FOREIGN PATENT DOCUMENTS

| EP | 0321876 | 6/1989 |
| EP | 0455580 | 11/1991 |

\* cited by examiner

*Primary Examiner*—Yonel Beaulieu
(74) *Attorney, Agent, or Firm*—Lowe Hauptman Ham & Berner, LLP (57) ABSTRACT

An automatic piloting device utilizing a measurement of ground speed deduced from the measurements of acceleration originating from an AHRS attitude and heading platform which it readjusts by ground speed information provided by a T readjustment device: satellite-based positioning receiver or a Doppler radar exhibiting periods of unavailability. This automatic piloting device includes a preprocessing part with readjustment blocks based on estimator filters of the complementary type of second order with two branches one of the first order, the other of the second order which are momentarily transformed into first-order complementary filters, by action on their branch gains, with each return of availability of the readjustment device.

16 Claims, 4 Drawing Sheets

AUTOMATIC PILOTING DEVICE FOR ROTARY WING AIRCRAFT

BACKGROUND OF THE INVENTION

1. Field of the Invention

The invention relates to the estimation of the speed relative to the ground of a rotary wing machine with a view to automatic control of the hovering phase of flight. It pertains, more particularly to the availability of such an estimation.

2. Description of the Related Art

On a rotary wing machine, the control of the speed relative to the ground in a flight phase of approach to a phase of hovering flight, then in a phase of hovering flight, is performed using information regarding speed relative to the ground as soon as the air speed goes below a certain value, typically 60 knots. In the hovering flight phase, the concept of speed relative to the ground is essential, since it is the zeroing thereof in the three axes of the carrier which allows immobilization of the machine independently of the wind conditions.

Aboard a craft, the information on the speed vector relative to the ground may originate from various sources implementing different physical principles:

an inertial navigation platform providing accelerometric information and angular rates, as well as, depending on its degree of complexity, information regarding attitude, ground and vertical speeds referenced along the axes of the carrier, and information regarding heading followed and instantaneous position, a Doppler radar delivering measurements of longitudinal and transverse ground speed in the axes of the carrier or a satellite-based positioning receiver delivering measurements of ground speed along north and east geographical axes.

An inertial platform bears various names: IMU, IRS, AHRS, INS (acronyms standing for the expressions: "Inertial Measurement Unit, Inertial Reference System, Attitude and Heading Reference System, Inertial Navigation System") which are dependent on its sophistication and on the diversity of the information provided. Its cost, which depends on its performance, on the precision of its information and on the drifting of the inertial and gyroscopic sensors used, spans a wide range of prices, so that any even slightly advanced flying machine is equipped with one. It has the advantage of not calling upon any outside assistance, of being able to be very precise over the short term and of always being available. However these advantages are counterbalanced by measurement bias and noise due to its inertial sensors and by medium- and long-term drifting, inherent in the mode of obtaining the speed and attitude information, by integration of measurements of acceleration or of angular rates, and in the mode of obtaining the position information by double integration of acceleration measurements.

Doppler radar, which also does not call upon any outside assistance, delivers speed information free of medium- and long-term drifting since the Doppler effect is manifested at the speed level. It is on the other hand prone to disturbances induced by abnormal "lock-ons" which sometimes cause its information not to be available.

The satellite-based positioning receiver calls upon a constellation of positioning satellites, the positions of the visible satellites of which it knows by virtue of ephemerides, so as to determine, by triangulation, its position and hence that of the carrier craft. The speed information which it delivers is not affected by drift but it is noisy on account of the low power of the signals that it receives from the positioning satellites and of variable precision depending on the geometry of the triangulation determined by the positions of the visible satellites. Moreover, its information is not always available since it is prone to antenna masking preventing it from sensing a sufficient number of satellites of the positioning system to get a position fix, either on account of the attitude of the flying machine on which it is mounted, or on account of the relief when the flying machine is operating close to the ground.

Although they are affected by drift, inertial platforms are the most widely used equipment for determining speed and attitudes since they are the only ones to offer absolute continuity of service. To combat their drift, it has always been sought to periodically readjust the information that they deliver with the aid of positioning or speed measurement devices offering lesser continuity of service but devoid of drift, such as Doppler radars and satellite-based positioning receivers.

Various methods for readjustment or hybridization have been proposed. Some of them call upon a so-called "Kalman" filtering technique which consists in modelling the dynamic behavior of the various errors encountered and of their dependency relations with the signals through which they are perceived from outside. This leads to adaptive filters which are lengthy and expensive to fine-tune on account of the difficulties of the modelling and which demand not inconsiderable calculation power in order to operate.

Another known method for readjustment or hybridization, less effective than Kalman filtering which is more robust to the modelling of errors, but, on the other hand, less demanding calculationally, calls upon an estimator filter having the structure of a Kalman filter with fixed gains.

SUMMARY OF THE INVENTION

It is an object of this invention to provide an automatic piloting device for rotary wing aircraft utilizing a measurement of ground speed deduced from the measurements of accelerations provided by an inertial platform, for example a so-called AHRS attitude and heading platform, which it readjusts by means of ground speed information provided by a readjustment device, satellite-based positioning receiver or Doppler radar, not prone to drifting, but possibly noisy.

It is a further object of the present invention to provide an automatic piloting device for rotary wing aircraft able to maintain a mode of passage to hovering flight or of holding of hovering flight during brief unavailabilities, less than a few seconds, of the signal of the readjustment device.

It is yet a further object of the present invention to provide an automatic piloting device for rotary wing aircraft with rapid return, after each period of unavailability of the readjustment device, of efficient compensation for drift of the measurement of ground speed deduced by the measurements of accelerations of an inertial platform.

According the invention, an automatic piloting device for rotary wing aircraft comprises means for preprocessing measurements of attitude, of roll pitch and yaw rotation rates, of accelerations and of ground speed provided by an inertial platform and by a readjustment device, delivering longitudinal and lateral components of the ground speed of the aircraft, compensated for drift, and means for formulation of the piloting orders or directives by applying flight control laws to the instantaneous conditions of flight using the preprocessed information delivered by the preprocessing means. The preprocessing means comprise at least one second-order complementary type estimator filter having two additive branches: a first branch, with positive nominal inherent gain $K_1$ comprising an integration stage, estimating a contribution to the readjustment of a speed bias and eliminating the noise of the signals of the readjustment device and a second branch, with positive nominal gain formed from the product of the inherent gain K1 of the first branch and of an inherent gain K2, comprising two successive integration stages and estimating the contribution to the readjustment of an acceleration bias. The inherent amplification gains K1, K2 are zeroed during the periods of unavailability of the readjustment device.

Advantageously, for a duration of resumption after each return of availability of the readjustment device, the inherent gain K1 of the first branch of the estimator filter is taken to a forcing value greater than its nominal value and that K2 of the second branch maintained at zero.

Advantageously, the duration of resumption is taken equal to 2 seconds.

Advantageously, the nominal values of the inherent gains K1 and K2 of the branches of the estimator filter lie in the span of the values [0, 1], the forcing value of the inherent gain K1 of the first branch being taken equal to 1.

Advantageously, the nominal value of the inherent gain K1 of the first branch of the estimator filter is taken equal to four times the nominal value of the inherent gain K2 of the second branch.

Advantageously, when the automatic piloting device is associated with a readjustment device having periods of availability intercut with periods of unavailability, the nominal values of the inherent gains $K_1$ and $K_2$ of the two branches of the estimator filter are fixed by the following system of parametric relations:

$$\begin{cases} K_1 = \dfrac{2}{T} \\ K_2 = \dfrac{1}{2T} \end{cases}$$

T being a parameter lying between 5 and 10, whose value corresponds to the maximum tolerable duration of unavailability of the second device, expressed in seconds.

Advantageously, when the automatic piloting device is associated with an inertial platform, with a database of magnetic declination and with a readjustment device of satellite-based positioning receiver type delivering measurements of the components $V_{lrec(N/S)}$ and $V_{lrec(E/W)}$ of the ground speed of the craft along geographical axes, its preprocessing part comprises, in addition to the estimator filter or filters:
  means for changing reference frames calculating the true heading $\psi_t$ and the horizontal components $V_{lrec(L)}$ and $V_{lrec(T)}$ along the longitudinal and transverse axes of the carrier craft, of the ground speed vector of the carrier craft delivered by the readjustment device in the geographical axes,
  means for calculation of compensations to be made to the longitudinal and transverse components $V_{lrec(L)}$ and $V_{lrec(T)}$ of the ground speed vector of the carrier craft delivered by the means for changing reference frames, compensations made necessary by the different locations, aboard the craft, of the sensors of the inertial platform and of those of the readjustment device,
  means for calculation of the rate of change of heading $\Psi_{dot}$ resulting from the roll attitude angle $\Phi$ and pitch attitude angle $\Theta$ and from their rates of evolution $p_1$ and $q_1$, and
  means for calculation of compensations of the acceleration measurements $\Gamma_{(L)}$, $\Gamma_{(T)}$ originating from the inertial platform taking account of the rate of change of heading $\Psi_{dot}$.

Advantageously, when the automatic piloting device is associated with an inertial platform, and with a readjustment device of Doppler radar type delivering measurements of the components $V_{ld(L)}$, $V_{ld(T)}$ and $V_{ld(Z)}$ of the ground speed of the craft according to a reference frame tied to the aircraft, its preprocessing part comprises, in addition to the estimator filter or filters:
  means for calculation of compensations to be made to the longitudinal and transverse components $V_{ld(L)}$ and $V_{ld(T)}$ of the speed vector of the carrier craft delivered by the means for changing reference frames, compensations made necessary by the different locations, aboard the craft, of the sensors of the inertial platform and of those of the readjustment device,
  means for calculation of the rate of change of heading $\Psi_{dot}$ resulting from the roll attitude angle $\Phi$ and pitch attitude angle $\Theta$ and from their rates of evolution $p_1$ and $q_1$, and
  means for calculation of compensations of the acceleration measurements $\Gamma_{(L)}$, $\Gamma_{(T)}$ originating from the inertial platform taking account of the rate of change of heading $\Psi_{dot}$.

BRIEF DESCRIPTION OF THE DRAWINGS

Other characteristics and advantages of the invention will emerge from the description hereinbelow of an embodiment given by way of example. This description will be offered in conjunction with the drawing in which:
  a FIG. 1 shows a piloting system for rotary wing aircraft, provided with an automatic piloting device associated with an AHRS-type attitude platform, with a GPS readjustment device or Doppler radar and with an FMS flight management system having a database of magnetic declination dependent on location and on date,
  a FIG. 2 details in the form of a block diagram the main processing conducted by the automatic pilot on the signals originating from the attitude platform and a readjustment device of satellite-based positioning receiver type so as to obtain a readjusted and noise-free ground speed measurement,
  a FIG. 3 details in the form of a block diagram the main processing conducted by the automatic pilot on the signals originating from the attitude platform and a readjustment device of Doppler radar type so as to obtain a readjusted and noise-free ground speed measurement,
  a FIG. 4 details the diagram of an estimation circuit used by the automatic pilot, for the readjustment of a speed measurement deduced from the inertial sensors of the attitude platform.

DETAILED DESCRIPTION OF THE EMBODIMENTS

To simplify the diagrams, only the signals useful for the hybridization of the measurements of ground speed components along the longitudinal and transverse axes of the carrier craft are mentioned in the figures.

Figure 1:
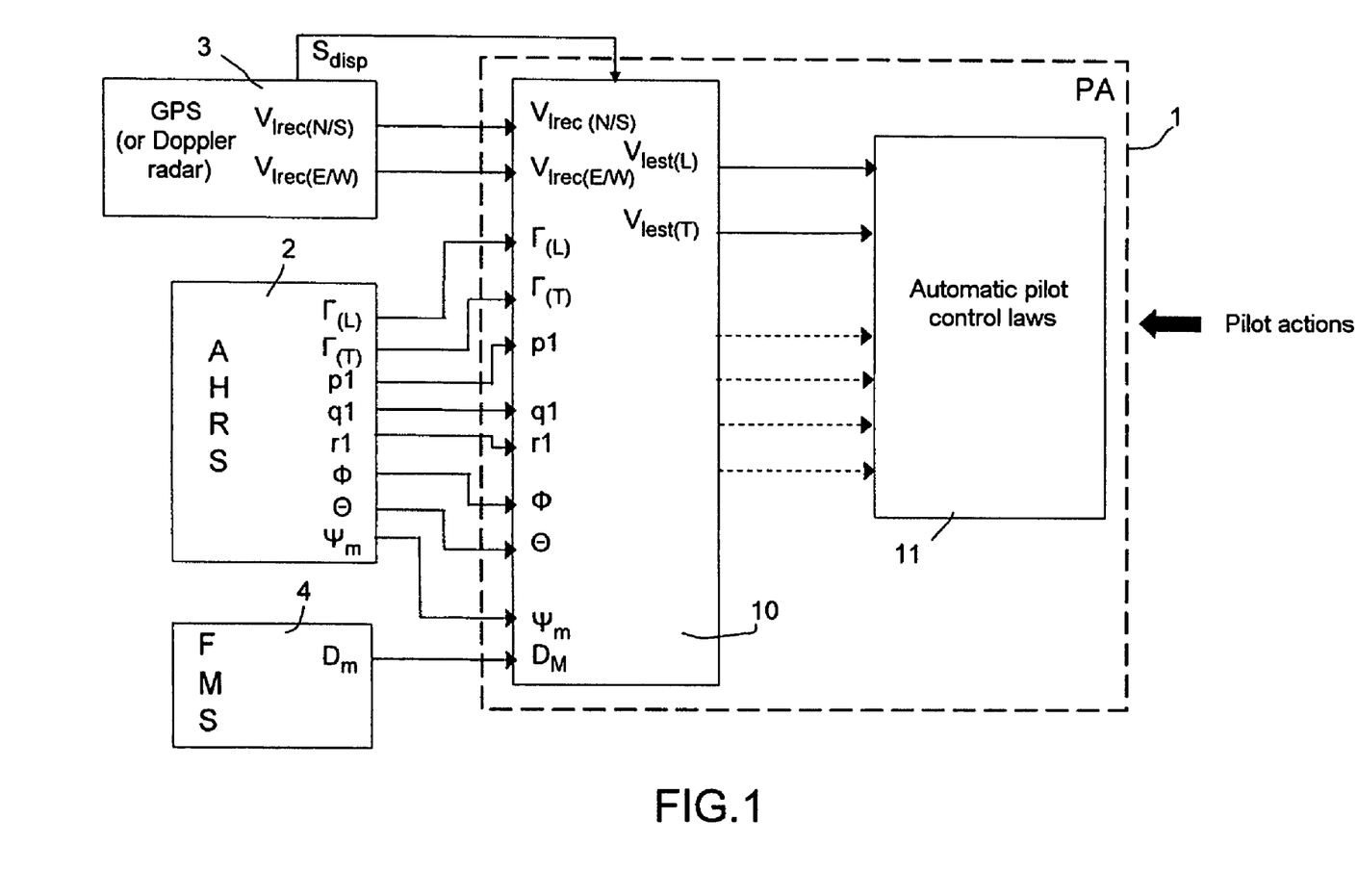

The piloting system shown in FIG. 1 is intended for a rotary wing aircraft. It comprises an automatic piloting device termed the "automatic pilot" 1 receiving diverse information on the attitude and the motion of the aircraft, from an inertial platform 2 of AHRS attitude and heading platform type, from a readjustment device 3 and from an electronic bank 4 of magnetic declinations that arises for example from a flight management system (FMS).

The AHRS platform 2 brings together sensors (accelerometers, gyros, magnetic compass), and means for processing and for shaping signals enabling it to provide basic information, on the attitude, on the accelerations, on the rates of rotation of the craft in roll, pitch and yaw, and on the magnetic heading, that are required by the automatic pilot 1 in order to fulfill its missions of aiding piloting.

All of the information regarding attitude, angular rates and heading required by the automatic piloting device 1 may be extracted solely from the measurements of the AHRS platform 2 and the value of magnetic declination derived from the magnetic declination electronic bank 4 but, as was indicated previously, this information is then affected by drift which must be periodically corrected by a readjustment operation so as to remain within tolerable error margins.

The automatic pilot 1 performs this readjustment operation before applying the control laws corresponding to the mode of piloting selected by the pilot. To ease understanding, the automatic pilot 1 has been represented in two parts: an upstream preprocessing part 10 performing the processing corresponding to the readjustment and a downstream part 11 implementing the control laws corresponding to the various modes of piloting. The control laws part 11 of the piloting will not be described since it is not part of the invention and is well known to the person skilled in the art.

The preprocessing part 10 of the automatic pilot relies, for the readjustment, on the readjustment device 3 which gives information of the same kind as the AHRS platform 2, in a more or less complete manner, but not affected by drift. This readjustment device 3 is either a satellite-based positioning receiver, or a Doppler radar. It calls upon different physical principles from those used by the AHRS platform 2 allowing it not to have any drift but the downside is a possibility of discontinuity of service justifying the presence of an AHRS platform 2.

The AHRS platform 2 comprises, in particular:

accelerometers providing, to the preprocessing part 10 of the automatic pilot, the longitudinal $\Gamma_{(L)}$ and transverse $\Gamma_{(T)}$ accelerations in a horizontal plane tied to the carrier, gyros providing, to the preprocessing part 10 of the automatic pilot, the rates of rotation p1, q1, r1 of the carrier in the roll, pitch and yaw axes, integrator circuits extracting by integration of the measurements of the gyros, the angles of attitude of the carrier in the roll $\Phi$ and pitch $\Theta$ axes, and a magnetic compass providing the preprocessing part 10 of the automatic pilot with the magnetic heading $\psi_m$.

The readjustment device 3 (satellite-based navigation receiver or Doppler radar) provides diverse information to the preprocessing part 10 of the automatic pilot of which FIG. 1 depicts only information regarding ground speed $V_{lrec(N/S)}$ of the carrier in the North-South direction and information regarding ground speed $V_{lrec(E/W)}$ of the carrier in the East-West direction.

The preprocessing part 10 of the automatic pilot delivers to the control law part 11 of the automatic piloting device various readjusted information including an estimate of readjusted longitudinal linear speed $V_{lest(L)}$ and an estimate of readjusted transverse linear speed $V_{lest(T)}$ as well as various information internal to the estimation process.

Figure 2:
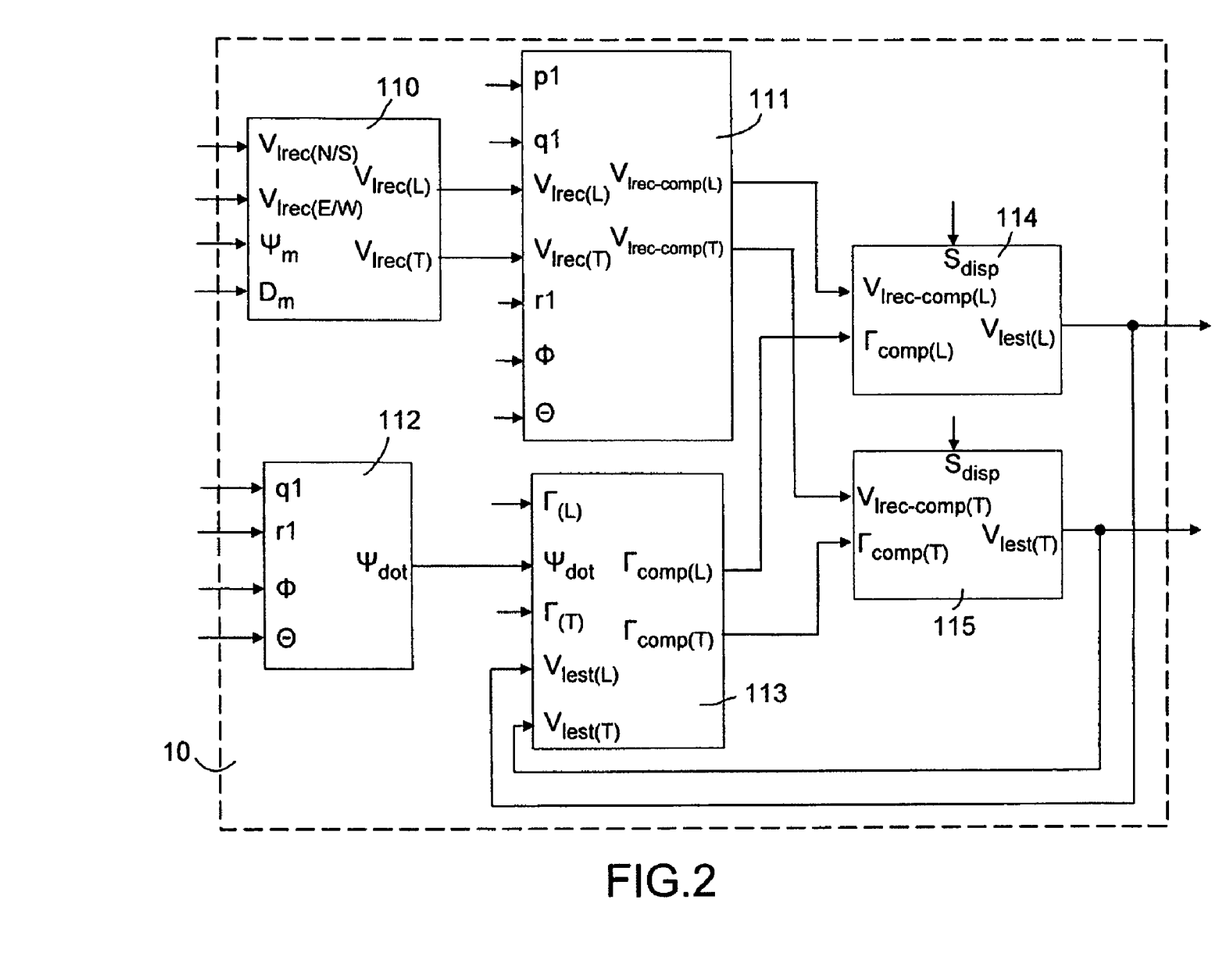

FIG. 2 details the processing performed, in the preprocessing part 10 of the automatic pilot 1, on the signals of the AHRS platform 2 and of a readjustment device 3 of satellite-based positioning receiver type, so as to deliver to a law of control, for example, of the hover mode, the information regarding readjusted longitudinal ground speed $V_{lest(L)}$ in the axes of the carrier and the information regarding readjusted transverse ground speed $V_{lest(T)}$ in the axes of the carrier. This processing part 10 comprises:

a block 110 for changing reference frames calculating the true heading $\psi_t$ and the components $V_{lrec(L)}$ and $V_{lrec(T)}$ along the longitudinal and transverse axes of the carrier craft, of the ground speed vector delivered by the readjustment device 3 in the geographical axes, a block 111 for calculating compensations to be made to the longitudinal and transverse components $V_{lrec(L)}$ and $V_{lrec(T)}$ of the speed vector of the carrier craft delivered by the reference frame changing block 110, compensations made necessary by the different locations, on board the craft, of the sensors of the attitude platform and of those of the readjustment device 3, a block 112 for calculating the rate of change of heading $\Psi_{dot}$ resulting from the roll attitude angle $\Phi$ and pitch attitude angle $\Theta$ and from their rates of evolution $q_1$ and $r_1$, a block 113 for calculating compensations of the acceleration measurements $\Gamma_{(L)}$, $\Gamma_{(T)}$ originating from the AHRS platform 2, taking account of the rate of change of heading $\Psi_{dot}$, and two readjustment blocks 114 and 115 providing, to the law of control of the selected mode of flight, the estimates of the longitudinal and transverse components $V_{lest(L)}$ and $V_{lest(T)}$ of the horizontal projection of the speed vector of the carrier craft.

The block for changing reference frames 110 determines the true heading $\psi_t$ on the basis of the measured heading $\psi_m$ delivered by the magnetic compass of the AHRS platform 2 and of the magnetic declination $D_m$ read from the electronic database 4 of magnetic declination on the basis of the geographical positioning of the carrier craft known elsewhere:

$$\Psi_t = \Psi_m + D_m$$

In possession of the true heading A, the reference frame changing block 110 determines the longitudinal and transverse components $V_{lrec(L)}$ and $V_{lrec(T)}$ of the speed vector measured by the readjustment device 3 by the relation:

$$\begin{bmatrix} V_{lrec(L)} \\ V_{lrec(T)} \end{bmatrix} = \begin{bmatrix} \cos\Psi_t & \sin\Psi_t \\ -\sin\Psi_t & \cos\Psi_t \end{bmatrix} \times \begin{bmatrix} V_{lrec(L)} \\ V_{lrec(T)} \end{bmatrix}$$

The block 111 for calculating speed compensations operates in a reference frame tied to the craft and centered on the sensors of the AHRS platform 2. It regards the speed compensations to be made as the vector product of the distance vector GA with components $(x_a, y_a, z_a)$ separating the sensors of the readjustment device 3 from those of the AHRS platform 2. Then projects this vector product into the horizontal plane through two successive rotations, one of the opposite $-\Phi$ of the angle of pitch and the other of the opposite of the angle of roll $-\Theta$ so as to determine its longitudinal and transverse components DVL, DVT. These operations are summarized by the matrix relation:

$$[DV] = [\Theta^r] \times [\Phi^r] \times \left[ \vec{GA} \wedge \vec{\Omega} \right]$$

with

-continued $$[DV] = \begin{bmatrix} DVL \\ DVT \\ DVz \end{bmatrix}; \quad [GA] = \begin{bmatrix} xa \\ ya \\ za \end{bmatrix}; \quad [\vec{\Omega}] = \begin{bmatrix} p1 \\ q1 \\ r1 \end{bmatrix}$$

$$[\Theta] = \begin{bmatrix} \cos\Theta & 0 & -\sin\Theta \\ 0 & 1 & 0 \\ \sin\Theta & 0 & \cos\Theta \end{bmatrix}; \quad [\Phi] = \begin{bmatrix} 1 & 0 & 0 \\ 0 & \cos\Phi & \sin\Phi \\ 0 & -\sin\Phi & \cos\Phi \end{bmatrix}$$

The components of the vector product are expressed by the relation:

$$\left[GA \wedge \vec{\Omega}\right] = \begin{bmatrix} DVx1 \\ DVy1 \\ DVz1 \end{bmatrix} = \begin{bmatrix} -q1*za + r1*ya \\ p1*za - r1*xa \\ -p1*ya + q1*xa \end{bmatrix}$$

and the compensations DVL, DVT of the longitudinal and transverse speeds by the relations:

$DVL=DVx1*\cos(\Theta)+DVy1*\sin(\Theta)*\sin(\Phi)+DVz1*\sin(\Theta)*\cos(\Phi)$ $DVT=DVy1*\cos(\Phi)-DVz1*\sin(\Phi)$ After having calculated the compensations DVL and DVT of the longitudinal and transverse speeds, the block 111 for calculating speed compensations apply them to the longitudinal speeds $V_{lrec(L)}$ and $V_{lrec(T)}$ received from the readjustment device 3 by way of the block 110 for changing reference frames:

$V_{lrec-comp(L)}=V_{lrec(L)}+DVL$ $V_{lrec-comp(T)}=V_{lrec(T)}+DVT$

The block 112 calculates from the rate of rotation of change of heading $\Psi_{dot}$ on the basis of the horizontal components of the rates of the rotational motions of the roll axis caused by yawing and pitching, by applying the relation:

$$\Psi_{dot} \text{ or } \dot{\Psi} = \frac{r_1 * \cos(\Phi) + q_1 * \sin(\Phi)}{\cos(\Theta)}$$

The block 113 calculates longitudinal and transverse acceleration compensations $\Gamma_{comp(L)}$ and $\Gamma_{comp(T)}$ correcting the effects of the rate of rotation of heading $\Psi_{dot}$ on the measurements of longitudinal and transverse acceleration $\Gamma_{(L)}$ and $\Gamma_{(T)}$ originating from the AHRS platform 2 by subtracting from the horizontal component of the measured acceleration vector ($\Gamma_{(L)}$, $\Gamma_{(T)}$), the vector product of the rate of rotation of change of heading $\Psi_{dot}$ times the estimate of the horizontal projection ($V_{lest(L)}$, $V_{lest(T)}$) of the speed vector delivered by the readjustment blocks 114, 115, in accordance with the relation:

$$\Gamma_{comp} = \Gamma - \vec{\Omega}_H \wedge V_{lest}$$

with:

$$\Gamma_{comp} = \begin{bmatrix} \Gamma_{comp(L)} \\ \Gamma_{comp(T)} \end{bmatrix}; \quad \Gamma = \begin{bmatrix} \Gamma_{(L)} \\ \Gamma_{(T)} \end{bmatrix}; \quad \vec{\Omega}_H = \begin{bmatrix} 0 \\ 0 \\ \dot\Psi \end{bmatrix}$$

or else, $\Gamma_{comp(L)} = \Gamma_L + V_{lest(T)} * \dot\Psi$ $\Gamma_{comp(T)} = \Gamma_T - V_{lest(L)} * \dot\Psi$ In order for the longitudinal and transverse compensated accelerations $\Gamma_{comp(L)}$ and $\Gamma_{comp(T)}$ to survive the fleeting unavailabilities of the readjustment device 3, the longitudinal and transverse speeds taken into account are not the longitudinal and transverse compensated speeds $V_{Lrec-comp(L)}$ and $V_{lrec-comp(T)}$ derived from the measurements of the readjustment device 3 but the longitudinal and transverse speeds $V_{lest(L)}$ and $V_{lest(T)}$ available at the output of the readjustment blocks 114 and 115.

Figure 3:
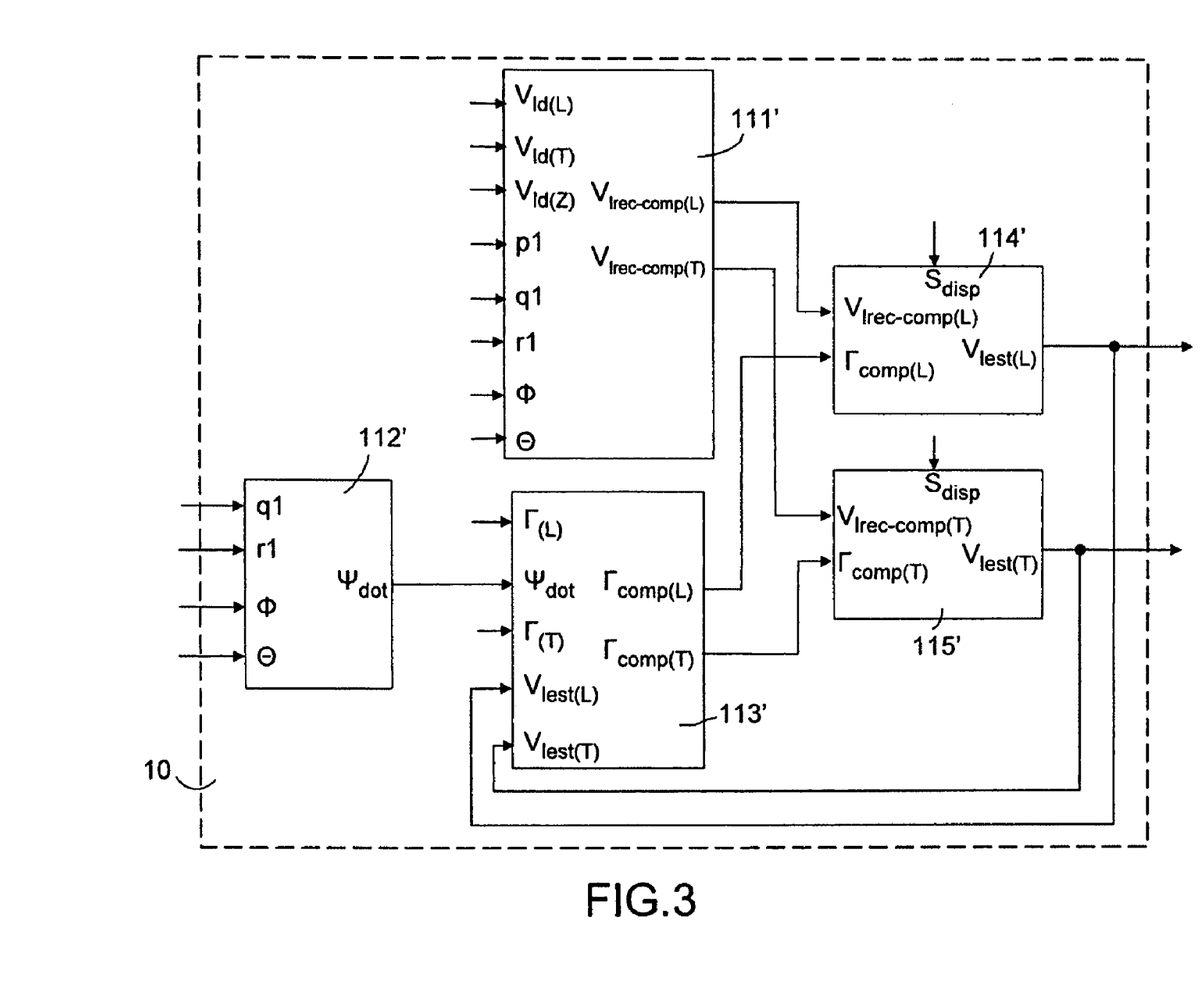

FIG. 3 details the processing performed, in the preprocessing part 10 of the automatic pilot 1 in the case where the readjustment device 3 is a Doppler radar providing directly the longitudinal, transverse and perpendicular components $V_{ld(L)}$, $V_{dl(T)}$ and $V_{ld(z)}$ of the ground speed vector $[V_d]$ in a reference frame tied to the craft. The block 110 for changing reference frames has disappeared since there is no longer any need for it. The other blocks are retained and assigned a "prime" index. These operate in the same way as in the previous case with the exception of the block 111' for calculating speed compensation which operates in a slightly different manner. Specifically, though it still determines the compensations in the reference frame tied to the craft, it no longer projects into the horizontal plane the compensation components but the longitudinal and transverse components of the compensated speed vector itself. The fact that the rotations are effected on the components of the compensated speed vector and not on the compensations alone is summarized by the matrix relation:

$[V_{rec-comp}]=[\Theta^t]\times[\Phi^t]\times([V_d]+[GA\wedge\vec{\Omega}])$

Figure 4:
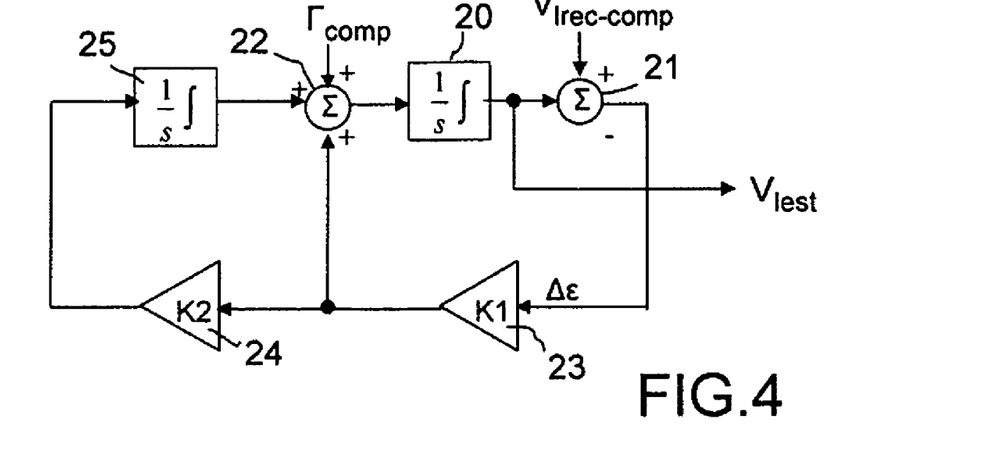

As shown in FIG. 4, each of the readjustment blocks 114 and 115 consists of an estimator filter of second-order complementary type which delivers the estimate of speed intended for the control laws part 11 of the automatic pilot 1, this speed estimate being either the estimate of longitudinal speed $V_{lest(L)}$, or the estimate of transverse speed $V_{lest(T)}$, according to the readjustment block considered 114 or 115.

This estimator filter controls, an implicit value of speed derived, by integration (integrator stage 20), from an acceleration measurement $\Gamma_{comp}$ which is, either the value $\Gamma_{comp(L)}$, or the value $\Gamma_{comp(T)}$ originating, after processing, from the AHRS platform 2. As a preset it receives an explicit value of speed $V_{lrec-comp}$ which is, either the value $V_{lrec-comp(L)}$, or the value $V_{lrec-comp(T)}$, originating from the readjustment device 3, estimates the deviation $\Delta\epsilon$ existing between the preset $V_{lrec-comp}$ and its output value $V_{lest}$ and produces, on the basis of the deviation $\Delta\epsilon$ noted with the preset, a corrective term which it adds to the acceleration value $\Gamma_{comp}$, before its integration.

The estimator filter is of the second-order complementary filter type with two additive branches:
  a first branch comprising an amplifier stage 23 of gain K1 followed by a single integrator stage 20, and
  a second branch having in common with the first branch, the amplifier stage 23 of gain K1 and the integrator stage 20, with, additionally, a second amplifier stage 24 of gain K2 and a second integrator stage 25 slipped in between the output of the integrator stage 23 and an auxiliary input of the adder 22.

The first branch (23, 22, 20) of the estimator filter is of first-order proportional integral type. Its inherent gain is the gain K1 afforded by the amplifier stage 23. It estimates a contribution of the speed bias to the readjustment and eliminates the noise of the GPS or Doppler radar signals.

The second branch (23, 24, 25, 22, 20) of the estimator filter is of second-order proportional integral type. Its gain is the product of the inherent gain K1 of the first branch and of an inherent gain K2 afforded by the second amplifier stage, 24 and estimates the contribution of the acceleration bias to the readjustment.

On account of its second-order complementary type, the estimator filter behaves as a low-pass filter blocking the high-frequency noise affecting the speed preset delivered by the readjustment device 3. It furthermore ensures, through its proportional integral type, a zeroing of the DC component of the bias affecting the accelerometric measurements originating from the sensors of the inertial platform 1.

The nominal values of the gains K1 and K2 of the two amplifier stages 23, 24 lie between zero and one, and depend on the maximum duration tolerated for an unavailability of the readjustment device 3. The nominal value of the gain K1 of the single amplifier stage 23 of the first branch is taken, preferably, equal to four times the nominal value of the gain K2 of the second amplifier stage 24 of the second branch. The values of the gains K1 and K2 may be fixed as a function of the following system of parametric relations:

$$\begin{cases} K_1 = \dfrac{2}{T} \\ K_2 = \dfrac{1}{2T} \end{cases}$$

with:

$$5 \le T \le 10$$

T being a parameter whose value corresponds to the maximum tolerable duration of unavailability of the second device, expressed in seconds.

When the readjustment device 3 is unavailable, it signaling this to the preprocessing part 10 of the automatic pilot by an auxiliary signaling $S_{disp}$, the gains K1, K2 of the two amplifier stages 23, 24 are forced to zero. This eliminates the contribution to the readjustment, of the speed bias originating from the first branch of the corrector circuit and pegs the contribution to the readjustment, of the acceleration bias originating from the second branch of the corrector circuit.

In customary fashion, at the end of a period of unavailability of the readjustment device 3, the gains K1 and K2 of the two amplifier stages 23, 24 of the two branches of the estimator filters of the readjustment blocks 114 and 115 are replaced at their nominal values and a certain time is required, due to the integrator stages 20, 25, for the speed estimates delivered to agree with the preset values provided by the readjustment device 3. This delay, which is added to an already prolonged readjustment lag, is particularly prejudicial in certain uses where the precision of measurement of the speed vector takes precedence, as during the passage or the immobilization of a rotary wing machine in the hovering flight phase.

Figure 5:
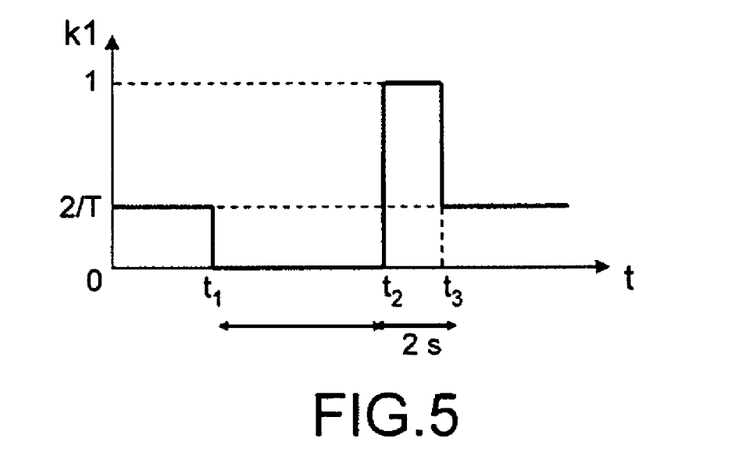
FIGS. 5 and 6 are time-dependent charts illustrating a management of the values of the gains of the branches of the slaving circuit shown in FIG. 4 in accordance with the process according to the invention.
Figure 6:
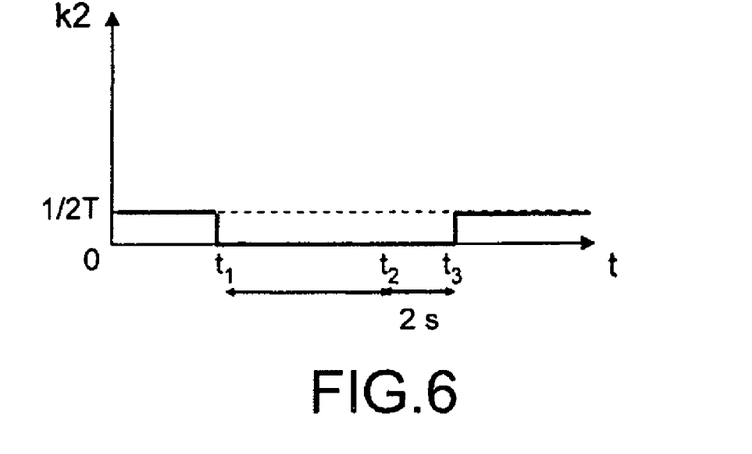

To reduce this delay, a period of resumption during which the gain K1 of the amplifier stage 23 of the first branch of the estimator circuit is forced to 1 is introduced at each return of availability of the information provided by the readjustment device 3, the gain K2 of the amplifier stage 24 remaining forced to zero. During this period of resumption of a typical value of 2 seconds, the estimator filter behaves as a first-order filter with a time constant equal to one second and the value of the acceleration bias estimated before the unavailability. The filtering of the GPS or Doppler noise is thus ensured immediately and the estimation of the accelerometer bias resumes two seconds later onwards of the last value stored. In case of long unavailability (>5 sec), the filter restarts from its initial state and not from its last state stored. FIGS. 5 and 6 show the evolutions of the values of the gains K1 and K2 of the amplifier stages 23, 25 of the two branches of the estimator filters of the readjustment blocks 114 and 115 before, during and after a period of unavailability of the information of the readjustment device 3.

A duration of unavailability of the information of the readjustment device 3 is assumed to begin at an instant $t_1$ and to finish at a later instant $t_2$. Between the instants $t_1$ and $t_2$ delimiting this duration of unavailability, the gains K1 and K2 of the amplifier stages 23, 25 are forced to zero. At the instant $t_2$ marking the end of the duration of unavailability and up to the instant $t_3$ marking the end of a duration of resumption, the gain K1 of the amplifier stage 23 is forced to one while the gain K2 of the amplifier stage 25 remains forced to zero. After the instant $t_3$ the gains K1 and K2 of the amplifier stages 23 and 25 revert to the nominal values of 2/T and 1/(2T) that they had before the instant $t_1$ marking the beginning of the duration of unavailability.

The method has the advantage of using information arising from an inertial platform of AHRS type (attitude and heading platform) and not of IRS type, since the latter type of system is not generally available on helicopters for reasons of weight and cost.

The method makes it possible to formulate at lesser cost a ground speed vector not available basically on an AHRS-type inertial platform and available only on a top-of-the-range inertial platform of IRS type.

The method uses no inertial position information available only on inertial platforms of IRS type.

The invention claimed is:

1. Automatic piloting device for rotary wing aircraft comprising:

means for preprocessing measurements of attitude, of roll pitch and yaw rotation rates, of accelerations and of ground speed provided by an inertial platform affected by drifting and noisy measurements of longitudinal and lateral components of the ground speed of the aircraft that are provided by a readjustment device exhibiting periods of unavailability, and means for formulation formulating piloting orders or directives by applying flight control laws to the instantaneous conditions of flight corresponding to the preprocessed information delivered by the preprocessing means;

said preprocessing means comprising at least one second-order complementary type estimator filter comprising two additive branches: a first branch, with positive nominal inherent gain $K_1$ comprising an integration stage, estimating a contribution to the readjustment of a speed bias and eliminating the noise of the signals of the readjustment device and a second branch, with positive nominal gain formed from the product of the inherent gain K1 of the first branch and of an inherent gain K2, comprising two successive integration stages and estimating the contribution to the readjustment of an acceleration bias; wherein said inherent gains K1, K2 are zeroed during the periods of unavailability of the readjustment device.

2. Automatic piloting device according to claim 1, wherein the inherent gain K1 of the first branch of the estimator filter is taken to a forcing value greater than its nominal value and the inherent gain K2 of the second branch maintained at zero during a duration of resumption after each return of availability of the readjustment device.

3. Automatic piloting device according to claim 2, wherein the duration of resumption is taken equal to 2 seconds.

4. Automatic piloting device according to claim 1, wherein the nominal values of the inherent gains K1 and K2 of the branches of the estimator filter lie in the span of the values [0, 1], the forcing value of the inherent gain K1 of the first branch being taken equal to 1.

5. Automatic piloting device according to claim 1, wherein the nominal value of the inherent gain K1 of the first branch of the estimator filter is taken equal to four times the nominal value of the inherent gain K2 of the second branch.

6. Automatic piloting device according to claim 1, wherein the nominal values of the inherent gains $K_1$ and $K_2$ of the two branches of the estimator filter are fixed by the following system of parametric relations:

$$\begin{cases} K_1 = \dfrac{2}{T} \\ K_2 = \dfrac{1}{2T} \end{cases}$$

T being a parameter lying between 5 and 10, whose value corresponds to the maximum tolerable duration of unavailability of the second device, expressed in seconds.

7. Automatic piloting device according to claim 1, associated with an inertial platform, with a database of magnetic declination and with a readjustment device of satellite-based positioning receiver type delivering measurements of the components $V_{lrec(N/s)}$ and $V_{lrec(E/W)}$ of the ground speed of the craft along geographical axes, wherein its preprocessing part comprises, in addition to the estimator filter or filters:

means for changing reference frames calculating the true heading $\psi_t$ and the horizontal components $V_{lrec(L)}$ and $V_{lrec(T)}$ along the longitudinal and transverse axes of the carrier craft, of the speed vector of the carrier craft delivered by the readjustment device in the geographical axes, means for calculation of compensations to be made to the longitudinal and transverse components $V_{lrec(L)}$ and $V_{lrec(T)}$ of the speed vector of the carrier craft delivered by the means for changing reference frames, compensations made necessary by the different locations, aboard the craft, of the sensors of the inertial platform and of those of the readjustment device, means for calculation of the rate of change of heading $\psi_{dot}$ resulting from the roll attitude angle $\Phi$ and pitch attitude angle $\Theta$ and from their rates of evolution $P_1$ and $q_1$, and means for calculation of compensations of the acceleration measurements $\Gamma_{(L)}$, $\Gamma_{(T)}$ originating from the inertial platform taking account of the rate of change of heading $\psi_{dot}$.

8. Automatic piloting device according to claim 7, wherein the means for changing reference frames determine the true heading $\psi_t$ on the basis of the measured heading $\psi_m$ delivered by the inertial platform and of the magnetic declination $D_m$ read from the magnetic declination database on the basis of the geographical positioning of the carrier aircraft known elsewhere by means of the relation:

$$\psi_t = \psi_m + D_m$$

and the longitudinal and transverse components $V_{lrec(L)}$ and $V_{lrec(T)}$ of the speed vector measured by the readjustment device by the relation:

$$\begin{bmatrix} V_{lrec(L)} \\ V_{lrec(T)} \end{bmatrix} = \begin{bmatrix} \cos\Psi_t & \sin\Psi_t \\ -\sin\Psi_t & \cos\Psi_t \end{bmatrix} \times \begin{bmatrix} V_{lrec(L)} \\ V_{lrec(T)} \end{bmatrix}.$$

9. Automatic piloting device according to claim 7, wherein the means of calculation of speed compensations determine the speed compensations to be performed by means of the matrix relation:

$$[DV] = [\Theta^t] \times [\Phi^t] \times [GA \wedge \vec{\Omega}]$$

[DV] being the compensation vector with its longitudinal, transverse and vertical components DVL, DVT and DVz,

[GA] being the distance vector with components ($X_a$, $y_a$, $Z_a$), separating the sensors of the readjustment device from those of the attitude platform,

[$\vec{\Omega}$] being the rate of rotation vector of the aircraft having as components the rate of rotation in roll p1, the rate of rotation in pitch q1 and the rate of rotation in yaw q1, and

[$\Theta$], [$\Phi$] being two rotations, one of the opposite $-\Phi$ of the angle of pitch and the other of the opposite of the angle of roll $-\Theta$ $$[DV] = \begin{bmatrix} DVL \\ DVT \\ DVz \end{bmatrix}; \quad [GA] = \begin{bmatrix} xa \\ ya \\ za \end{bmatrix}; \quad [\vec{\Omega}] = \begin{bmatrix} p1 \\ q1 \\ r1 \end{bmatrix}$$

$$[\Theta] = \begin{bmatrix} \cos\Theta & 0 & -\sin\Theta \\ 0 & 1 & 0 \\ \sin\Theta & 0 & \cos\Theta \end{bmatrix}; \quad [\Phi] = \begin{bmatrix} 1 & 0 & 0 \\ 0 & \cos\Phi & \sin\Phi \\ 0 & -\sin\Phi & \cos\Phi \end{bmatrix}.$$

10. Automatic piloting device according to claim 9, wherein the means for calculation of speed compensations determine the longitudinal and transverse components $V_{rec\text{-}comp(L)}$ and $V_{rec\text{-}comp(T)}$ of the compensated measurement of speeds ground speed on the basis of the longitudinal and transverse components $V_{rec(L)}$ and $V_{rec(T)}$ of the measurement of ground speed delivered by the means of changing reference frames and the compensation components, by applying the relation:

$$V_{lrec\text{-}comp(L)} = V_{lrec(L)} + DVL$$

$$V_{lrec\text{-}comp(T)} = V_{lrec(T)} + DVT.$$

11. Automatic piloting device according to claim 7, wherein the means for calculation of the compensations of accelerations determine compensations to be applied to the measurements of longitudinal and transverse acceleration $\Gamma_{(L)}$ and $\Gamma_{(T)}$ originating from the attitude platform by subtracting from the horizontal component of the measured acceleration vector ($\Gamma_{(L)}$, $\Gamma_{(T)}$), the vector product of the rate of rotation of change of heading $\square_{dot}$ times the estimate of the horizontal projection ($V_{lest(L)}$, $V_{lest(T)}$) of the speed vector delivered to the automatic piloting device in accordance with the matrix relation:

$\Gamma_{comp} = \Gamma - \vec{\Omega}_H \wedge V_{lest}$ $\Gamma_{comp}$ being the projection of the compensated acceleration vector in the plane containing the longitudinal and transverse axes of the aircraft, $\Gamma$ being the projection, in the plane containing the longitudinal and transverse axes of the aircraft, of the acceleration vector provided by the inertial platform ):

$$\Gamma_{comp} = \begin{bmatrix} \Gamma_{comp(L)} \\ \Gamma_{comp(T)} \end{bmatrix}; \quad \Gamma \begin{bmatrix} \Gamma_{(L)} \\ \Gamma_{(T)} \end{bmatrix}; \quad \vec{\Omega}_H = \begin{bmatrix} 0 \\ 0 \\ \psi \end{bmatrix}.$$

12. Automatic piloting device according to claim 7, wherein the means for calculation of the rate of rotation of change of heading operate on the basis of the relation:

$$\psi_{dot} \text{ or } \psi = \frac{r_1 * \cos(\Phi) + q_1 * \sin(\Phi)}{\cos(\Theta)}.$$

13. Automatic piloting device according to claim 1, associated with an inertial platform and with a readjustment device of Doppler radar type delivering measurements of the components $V_{ld(L)}$, $V_{ld(T)}$ and $V_{ld(Z)}$ of the ground speed of the craft according to a reference frame tied to the aircraft, wherein its preprocessing part comprises, in addition to the estimator filter or filters:

means for calculation of compensations to be made to the longitudinal and transverse components $V_{ld(L)}$ and $V_{ld(T)}$ of the speed vector of the carrier craft delivered by the means for changing reference frames, compensations made necessary by the different locations, aboard the craft, of the sensors of the inertial platform and of those of the readjustment device, means for calculation of the rate of change of heading $\psi_{dot}$ resulting from the roll attitude angle $\Phi$ and pitch attitude angle $\Theta$ and from their rates of evolution $p_1$ and $q_1$, and means for calculation of compensations of the acceleration measurements $\Gamma_{(L)}$, $\Gamma_{(T)}$ originating from the inertial platform taking account of the rate of change of heading $\psi_{dot}$.

14. Automatic piloting device according to claim 13, wherein the means for calculation of speed compensations determine the longitudinal and transverse components $V_{rec\text{-}comp(L)}$ and $V_{rec\text{-}comp(T)}$ of the compensated measurement of ground speed by applying the matrix relation:

$[V_{rec\text{-}comp}] = [\Theta'] \times [\Phi'] \times ([V_d] + [GA \wedge \vec{\Omega}])$

[DV] being the compensation vector with its longitudinal, transverse and vertical components DVL, DVT and DVz,

[GA] being the distance vector with components ($X_a$, $y_a$, $Z_a$), separating the sensors of the readjustment device from those of the attitude platform, $\vec{\Omega}$ being the rate of rotation vector of the aircraft having as components the rate of rotation in roll p1, the rate of rotation in pitch q1 and the rate of rotation in yaw q1, and $[\Theta]$, $[\Phi]$ being two rotations, one of the opposite $-\Phi$ of the angle of pitch and the other of the opposite of the angle of roll $-\Theta$ $$[DV] = \begin{bmatrix} DVL \\ DVT \\ DV_z \end{bmatrix}; \quad [GA] = \begin{bmatrix} xa \\ ya \\ za \end{bmatrix}; \quad [\vec{\Omega}] = \begin{bmatrix} p1 \\ q1 \\ r1 \end{bmatrix}$$

$$[\Theta] = \begin{bmatrix} \cos\Theta & 0 & -\sin\Theta \\ 0 & 1 & 0 \\ \sin\Theta & 0 & \cos\Theta \end{bmatrix}; \quad [\Phi] = \begin{bmatrix} 1 & 0 & 0 \\ 0 & \cos\Phi & \sin\Phi \\ 0 & -\sin\Phi & \cos\Phi \end{bmatrix}.$$

15. Automatic piloting device according to claim 13, wherein the means for calculation of the compensations of accelerations determine compensations to be applied to the measurements of longitudinal and transverse acceleration $\Gamma_{(L)}$ and $\Gamma_{(T)}$ originating from the attitude platform by subtracting from the horizontal component of the measured acceleration vector ($\Gamma_{(L)}$, $\Gamma_{(T)}$), the vector product of the rate of rotation of change of heading $\psi_{dot}$ times the estimate of the horizontal projection ($V_{lest(L)}$, $V_{lest(T)}$) of the speed vector delivered to the automatic piloting device in accordance with the matrix relation:

$\Gamma_{comp} = \Gamma - \vec{\Omega}_H \wedge V_{lest}$ $\Gamma_{comp}$ being the projection of the compensated acceleration vector in the plane containing the longitudinal and transverse axes of the aircraft, $\Gamma$ being the projection, in the plane containing the longitudinal and transverse axes of the aircraft, of the acceleration vector provided by the inertial platform:

$$\Gamma_{comp} = \begin{bmatrix} \Gamma_{comp(L)} \\ \Gamma_{comp(T)} \end{bmatrix}; \quad \Gamma \begin{bmatrix} \Gamma_{(L)} \\ \Gamma_{(T)} \end{bmatrix}; \quad \vec{\Omega}_H = \begin{bmatrix} 0 \\ 0 \\ \psi \end{bmatrix}.$$

16. Automatic piloting device according to claim 13, wherein the means for calculation of the rate of rotation of change of heading operate on the basis of the relation:

$$\psi_{dot} \text{ or } \psi = \frac{r_1 * \cos(\Phi) + q_1 * \sin(\Phi)}{\cos(\Theta)}.$$

* * * * *